R. J. BOWEN.
CULINARY UTENSIL.
APPLICATION FILED JUNE 28, 1912.

1,066,788.

Patented July 8, 1913.

Witnesses:
Charlotte Young.
May Downey.

Inventor:
Richard J. Bowen
By Oliphant & Young
Attorneys.

UNITED STATES PATENT OFFICE.

RICHARD J. BOWEN, OF MILWAUKEE, WISCONSIN.

CULINARY UTENSIL.

1,066,788.  Specification of Letters Patent.  Patented July 8, 1913.

Application filed June 28, 1912. Serial No. 706,429.

*To all whom it may concern:*

Be it known that I, RICHARD J. BOWEN, a citizen of the United States, and resident of Milwaukee, in the county of Milwaukee and State of Wisconsin, have invented certain new and useful Improvements in Culinary Utensils; and I do hereby declare that the following is a full, clear, and exact description thereof.

My invention has for its object to provide a simple, economical, effective and convenient culinary utensil, the same being particularly designed for use in connection with the preparation of eggs or like articles where confinement thereof within certain limits or separation is required, the essential feature being the provision of a slidable bottom in connection with a vessel whereby said bottom may be opened or closed to discharge the egg or other prepared article of food.

Another object of my invention is to provide a screened partition in connection with such vessels whereby the yolk of eggs can be separated from the white, the separation being effected by straining the white through the screen cover and thereafter dropping the yolk through the open bottom. This form of my invention is particularly designed for use in connection with preparing food for invalids or for separating the egg fluids in the preparation of beverages or for cooking purposes.

With the above objects in view the invention consists in certain peculiarities of construction and combination of parts as set forth hereinafter with reference to the accompanying drawings and subsequently claimed.

In the drawings Figure 1 represents a longitudinal sectional view of a culinary utensil embodying the features of my invention; Fig. 2, a similar sectional view of another form of my invention, the same being shown adjusted within a receptacle, and Fig. 3 illustrates a bottom plan view of the same with parts broken away and in section to more clearly show the construction.

Referring by characters to the drawings, Fig. 1, 1 represents an open bottom hopper having a web 2 extending from said open bottom, which web is preferably rectangular in shape and is provided with edges that are folded upon three sides, the parallel folded sides forming runways 3, while the transverse folded end 3' constitutes an abutting stop. The opposite transverse edge of the web 3 has extending thereacross a strap 4, which strap is slightly offset from the web proper and forms a retainer for a rectangular bottom plate 5 that has sliding engagement within the runways 3. The plate is also provided with a stop-bead 5' and a looped handle 5'', the stop-bead serving to limit the opening movement of the bottom-plate which is arranged to slide back and forth within the runways. At a predetermined distance from the bottom plate the hopper has fitted therein a screened cover 6, which cover is connected to the hopper by a hinge 6' and is adapted to be raised and lowered by a lift-bar 7 which is hinged to the cover and extending upward and over the mouth of the hopper, at which point it is bent at a right-angle and terminates with a loop 7' which engages a hopper handle 8 that is rigidly secured to the same.

Referring to Figs. 2 and 3 of the drawings, 1' represents a bottomless hopper that is provided with a web 2' that extends from its lower edge, the web being similar in construction to the web previously described and has parallel folded edges 2'' that constitute runways for a slidable bottom-plate 5'''. The web is also provided with a transverse end-fold 2''' and a transverse retaining strap 4' that serves as a clip for the slidable bottom-plate, the bottom-plate being also similar to that bottom-plate previously described and having a stop-bead 4''. The web of this type of vessel is formed with drain apertures 9 at intervals about the circumference of the hopper, which apertures permit drainage of liquids from the hopper due to the fact that the slidable bottom plate 5''' when closed will not seat tightly upon the bottom face of the web. The hopper of this utensil is also provided with a handle 8', which handle is rigidly secured thereto and is formed with a loop 8'' at a point intermediate of its length. This loop is adapted to be adjusted over the upper edge of the wall *a* of a receptacle whereby the utensil is sustained at a predetermined elevation in said receptacle, this elevation being determined by the adjustment of a ring 10 that engages the loop, against which ring the edge of the receptacle abuts, the said ring being held in its adjusted position by a thumb-screw 11.

Referring to the form of culinary utensil shown in Fig. 1, when it is desired to separate the yolk of an egg from the white, the screen-cover being open, the shell of the egg is broken and the contents dropped into the hopper. Thereafter the screen-cover 6 is closed to the position shown in full lines by manipulating the lift-bar. Thus the yolk or more solid portion of the egg is confined between the screen-cover and slidable bottom and thereafter the position of the vessel is inverted whereby the white of the egg is strained off and discharged through the mouth of the hopper. The vessel is then inverted to its normal position and the bottom plate being pulled out will permit the yolk to be deposited as required. By this manipulation of the egg it is apparent that it does not come in contact with the hands of the chef or cook and is thus entirely free from contamination.

Referring to that form of culinary utensil shown in Fig. 2, the same is especially designed for cooking eggs by the poaching process as previously stated. To accomplish the desired result in this instance the egg is broken into the utensil and the latter is, together with its contents, immersed in water contained in the vessel a, whereby the egg is thoroughly poached and the white portion is confined by the vessel walls in such relation to the yolk that when said egg is cooked it can be deposited upon a platter in a symmetrical form by simply sliding out the bottom plate, it being apparent that the water contained in the hopper can be drained out through the apertures 9 and the leakage due to looseness of the fit between the sliding plate and the web to which it is adjusted. Thus it is apparent that there is no handling of the egg before it is poached and owing to the fact that the same is confined there will be no detached stringers or flowing of the white of the egg whereby a great portion of the latter will become broken and lost. It is also apparent that the appetizing appearance of the egg is all that could be wished for.

From the foregoing description it is apparent that if desired the hopper portion of the poaching utensil can be varied in shape to conform to any design that would appeal to the taste of the public.

I claim:

1. A culinary utensil comprising a bottomless hopper, a web extending from the bottom edge thereof having parallel edges that constitute runways, a bottom-plate in slidable union with the runways, a screen cover disposed within the hopper and in hinge connection therewith, and manipulating means extending from the screen cover over and beyond the mouth of the same.

2. A culinary utensil comprising a bottomless hopper, a rectangular web extending from the bottom edges of the hopper, inward folds extending from three sides of the rectangular web, two of which folds constitute runways, a transversely arranged strap connecting the runway folds adjacent to one end thereof, a rectangular bottom plate in slidable engagement with the runway folds, one edge of the plate being adapted to enter the third web fold, and a transversely disposed stop-bead extending from the plate for engagement with the strap.

In testimony that I claim the foregoing I have hereunto set my hand at Milwaukee, in the county of Milwaukee and State of Wisconsin, in the presence of two witnesses.

RICHARD J. BOWEN.

Witnesses:
GEO. W. YOUNG,
M. E. DOWNEY.